3,033,104
FILTERING DEVICE FOR INFUSIONS, PULPS
AND THE LIKE
Francesco Manaresi, 12 Via Porte Nuove 12,
Florence, Italy
Filed Aug. 8, 1960, Ser. No. 48,071
2 Claims. (Cl. 100—125)

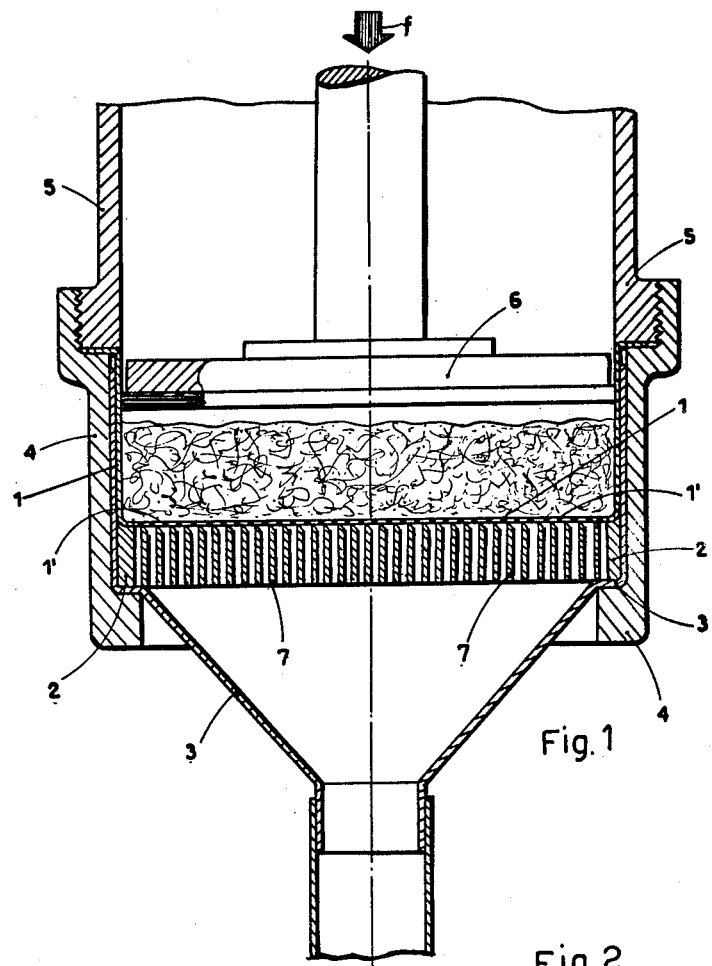
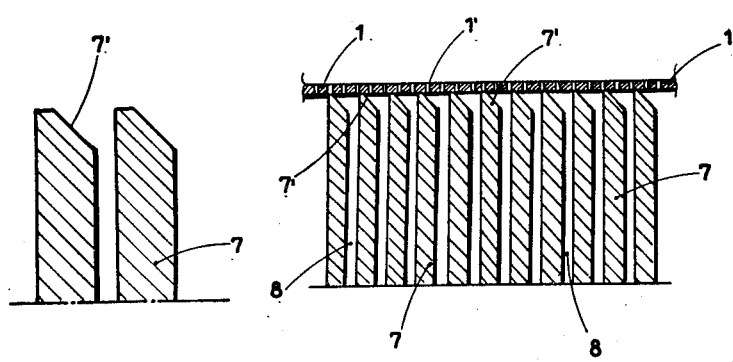

This invention concerns a filtering device for coffee infusions or the like.

As is known, industry markets powders made from coffee infusions, generally known as instant coffee. For this purpose it is necessary to use large quantities of coffee infusion obtained from the ground coffee. The infusions are diluted with water and filtered. This filtering causes many difficulties, because the usual filters, having a high production capacity, are made from thin gauge material provided with many holes. The filters do not have a sufficient strength to sustain the pressures required to expedite the filtering process. Such pressures must be exerted on the coffee infusion and ground coffee to shorten the filtering time. If the thickness or gauge of the filter is increased to obtain a certain strength, the holes to be machined in the filter must be increased in their length. The lengthened holes are easily clogged and unclogging is difficult and slow.

If in the filter of increased thickness or gauge, the holes are made like funnels, funnels which would allow easier unclogging, more space is required between each hole and the next one so as to decrease excessively the portion of the filter which passes fluid with respect to the total filter area.

Although the above difficulties are manifest in the case of coffee infusion filtering, it is apparent that similar difficulties will be encountered in filtering fruit and vegetable preparations to obtain juices.

The present invention is directed at avoiding the above mentioned difficulties and allows the use of the filters provided with a requisite number of holes. The invention provides a filter in which the fluid passage area for the filtered product is large in relation to the total filtering surface.

The invention has as it object, provision of certain spaced supports underlying the thin filter. These supports are designed in such a manner that while the thin filter sheet containing many holes is supported at many points, strain and breakdown of the filter is avoided under the pressure which is applied during filtering. The supports do not impair the passage of the filtered liquid through the thin filter. Thus, there is obtained the advantage of exerting a high pressure during filtering to pass the liquid to an underlying collecting container.

The invention will be better understood from the following specification and the accompanying drawing, which illustrates an embodiment of the invention.

In the drawing:

FIG. 1 diagrammatically illustrates a cross-section of an assembly according to the invention;

FIG. 2 illustrates on a larger scale a support combined with a thin filter; and

FIG. 3 illustrates on a still larger scale a support element for the filter, according to the invention.

Referring to the accompanying drawing, which shows an embodiment of the invention, a thin gauge filter sheet 1 provided with numerous holes 1' is peripherally supported by a support 2. This support may seat on a shoulder 3 of a large funnel or hopper. The funnel is in turn supported by a cylindrical element 4 having an inner flange shown in FIG. 1 of the drawing. Sheet 1 is the flat bottom of a cup-shaped member fitted inside element 4.

A cylinder 5 is engaged with the element 4. The cylinder is supplied with the infusion containing ground coffee or other infusions or juices are poured into the cylinder 5. A suitable appropriately actuated pusher plate 6 acts in the direction of the arrow f and is guided in the cup-shaped member.

In the space enclosed by the support 2, and lying within or forming part of said support, are support elements 7. A certain number of support elements 7 are provided, all integral with the support 2 and lying on the shoulder 3.

These mutually connected support elements contact at their top, the lower surface of the filter 1. The support elements are arranged close together and are shaped in such a way particularly at their upper portions so as to restrict their contact surface with the filter to minimize blocking of the holes of the filter. Each bearing element is sufficiently massive in transverse cross-section to resist the stresses due to the pressures applied during filtering. The support elements 7 are made of thin plates or sheets provided at their upper portions with a chamfering 7'. (See FIGS. 2 and 3.) This arrangement, shaping and positioning allows the support elements to maintain their strength while restricting each bearing or contact surface to the small upper plane surface of the element 7. The elements are spaced appropriately from one another, for instance, by a space 8, so that the flow of the filtered liquid is kept uniform, not withstanding their presence.

With this device, the liquid can be made to flow into the filter by exertion of pressure with the plunger plate 6 in the direction of the arrow f. This pressure exerted on the mass of ground coffee which remains above the filter will not damage, weaken or tear the filter 1, because it is supported by many support elements 7. Due to the pressure on the filtering mass, filtering is facilitated and the filtering time is greatly shortened.

The system may be used for filtering of infusions or pulps, such as fruit pulp, in addition to coffee infusions.

Although the drawing shows only one embodiment as a practical demonstration of the invention, the invention may be varied in forms and arrangements, without however departing from the scope of the concept defined by the appended claims. For instance, the support elements 7 may be small sheets or plates which extend chordally and diametrally parallel to each other under the filter, if the filter is circular. The spacing of the elements 7 will be not more than one third their width as shown in FIGS. 1–3. The chamfering 7' extends no more than one third the width of each element. This arrangement effectively exposes the holes 1' between elements 7.

It will be apparent to those skilled in the art that various modifications may be made herein shown and described without departing from the spirit and scope of the invention as defined in the appended claims.

What I claim is:

1. A filtering device comprising a cylindrical container, a plunger plate movable axially of said container, a funnel-like hopper connected to the casing in axial alignment therewith, said hopper having an annular peripheral shoulder, a support structure on said shoulder, said structure including a plurality of spaced thin plates each having a generally rectangular cross-section with the length of the cross-section parallel to the axis of the casing and with the width of the cross-section perpendicular thereto, each of the plates having an upper edge chamfered to no more than one-third the width of the cross-section of the plate, leaving a flat surface on the top of each plate having a width of no more than one-third the width of the plate, the spacing of the plates being no more than one-third the widths of the plates, and a cup-shaped filtering element having a cylindrical wall fitted in the container and guiding movement of said plunger plate, said filtering element having a flat bottom formed with numerous small holes communicating between the container and the hopper, said flat bottom overlaying and contacting the flat surfaces on the tops of the plates.

2. A filtering device comprising a plurality of thin plates each having a rectangular cross-section, said plates being disposed parallel to each other and spaced apart not more than one-third the widths of the plates, each of the plates having an upper edge chamfered to no more than one-third the width of the plate leaving a flat surface on top of each plate having a width of no more than one-third the width of the plate, and a flat filtering sheet overlying the flat surfaces of the plates, said sheet having numerous holes exposed in the spaces between the plates.

References Cited in the file of this patent

UNITED STATES PATENTS

| Re. 3,702 | Littlefield | Nov. 2, 1869 |
| 135,514 | Boomer | Feb. 4, 1873 |
| 260,427 | Smith | July 4, 1882 |
| 305,224 | Pratt et al. | Sept. 16, 1884 |

FOREIGN PATENTS

| 258,341 | Italy | Apr. 17, 1928 |